United States Patent [19]

Zermati et al.

[11] Patent Number: 5,026,330
[45] Date of Patent: Jun. 25, 1991

[54] TENSIONER FOR A POWER TRANSMISSION BELT

[75] Inventors: Charles Zermati, Maurepas; Pierre Bristot, Montargis, both of France

[73] Assignee: Hutchinson, Paris, France

[21] Appl. No.: 494,274

[22] Filed: Mar. 15, 1990

[30] Foreign Application Priority Data

Mar. 17, 1989 [FR] France .................................. 89 03512

[51] Int. Cl.⁵ .............................................. F16H 7/12
[52] U.S. Cl. ...................................... 474/138; 474/110
[58] Field of Search .............................. 474/109–111, 474/117, 119, 133–136, 138

[56] References Cited

U.S. PATENT DOCUMENTS

| | | | |
|---|---|---|---|
| 4,728,317 | 3/1988 | Martz et al. | 474/110 |
| 4,761,155 | 8/1988 | Kinoshita et al. | 474/110 |
| 4,773,892 | 9/1988 | Zarifé et al. | 474/138 |
| 4,790,801 | 12/1988 | Schmidt et al. | 474/110 |
| 4,798,563 | 1/1989 | Okabe et al. | 474/110 |
| 4,911,679 | 3/1990 | Inoue et al. | 474/110 |

*Primary Examiner*—Thuy M. Bui
*Attorney, Agent, or Firm*—Browdy & Neimark

[57] ABSTRACT

A tensioner is provided for a power transmission belt comprises a tensioning roller with which the belt cooperates, a return spring for controlling the displacement of said roller when the tension of the belt decreases and means for damping the vibrations likely to occur in the belt and comprising two variable volume chambers filled with a liquid and communicating together at one of their ends through a valve device through which the passage of the liquid entering and/or leaving said chambers introduces the damping effect, wherein the sidewall at least of one of the chambers is a membrane made from an elastomer material, such as rubber, having a general bell-shape and without spring, and the return spring associated with the other chamber is formed by a coil spring working under compression, prestressed in its rest state.

6 Claims, 3 Drawing Sheets

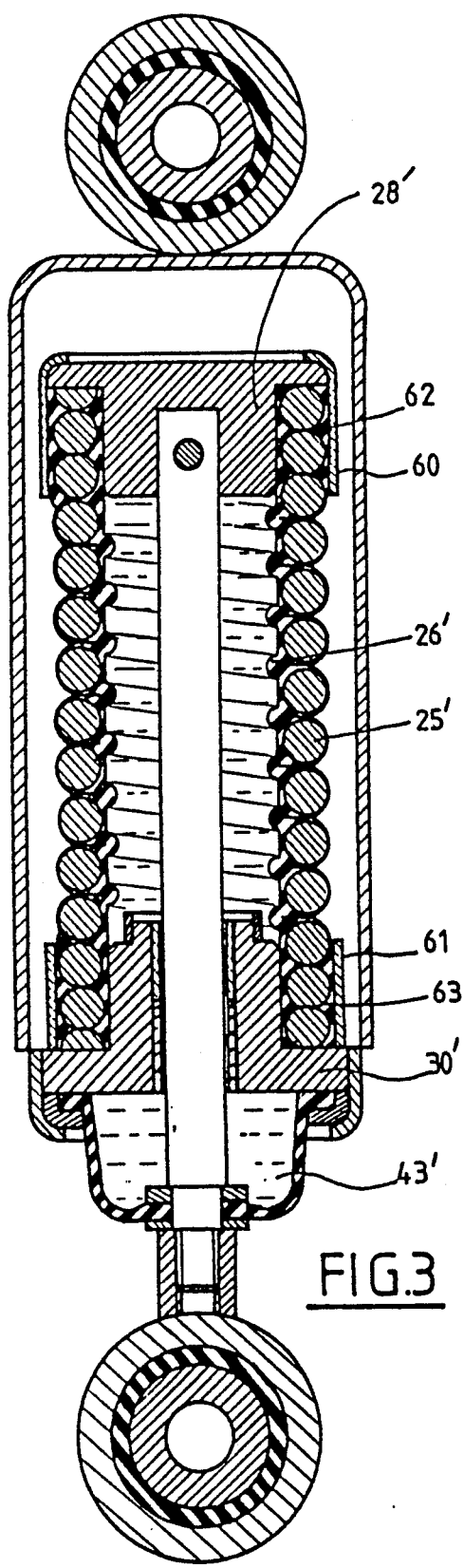
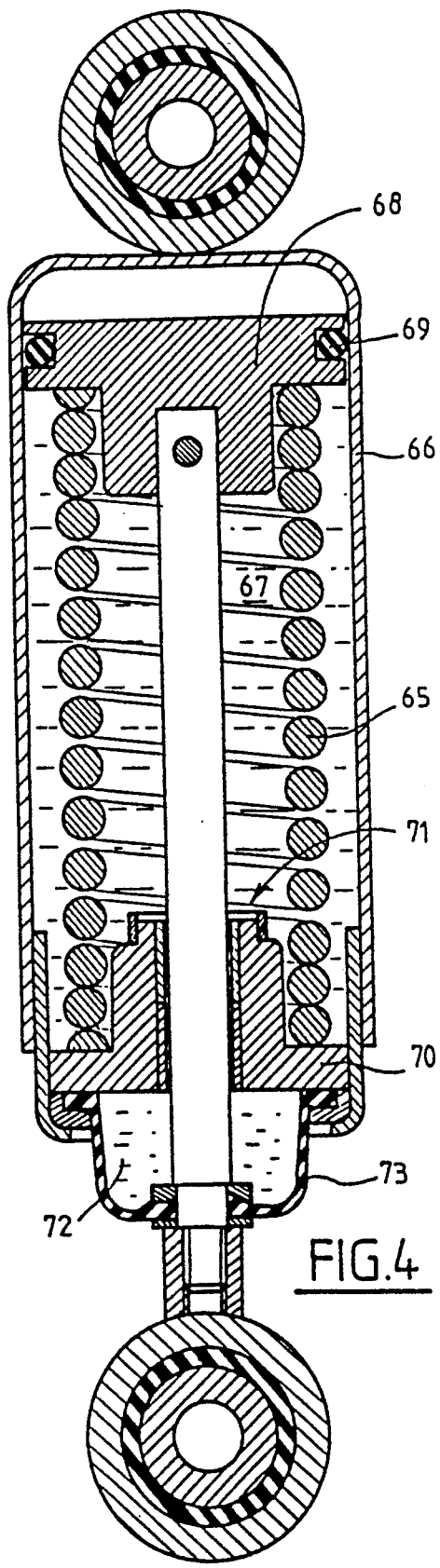

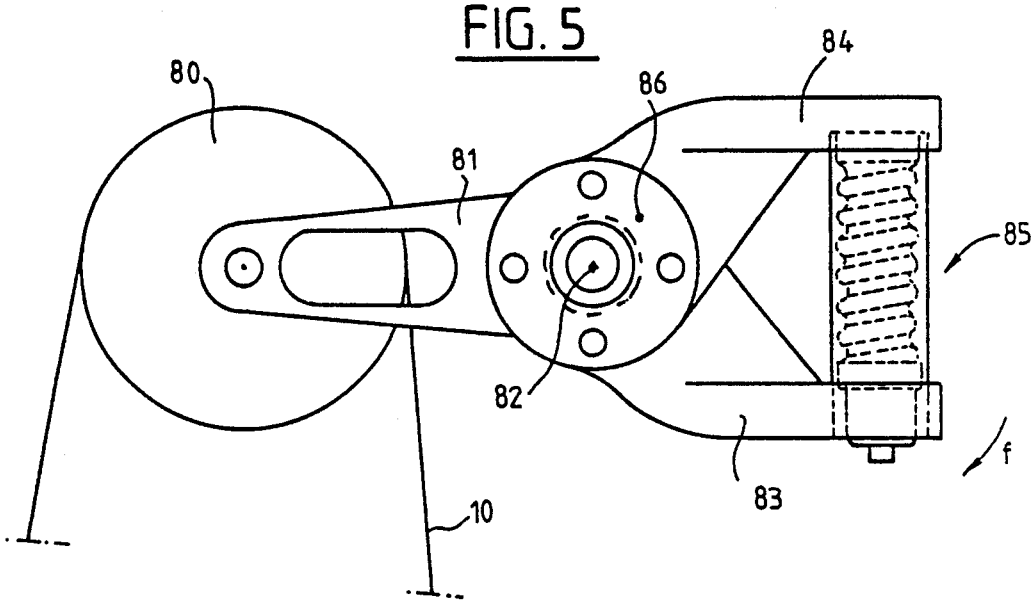
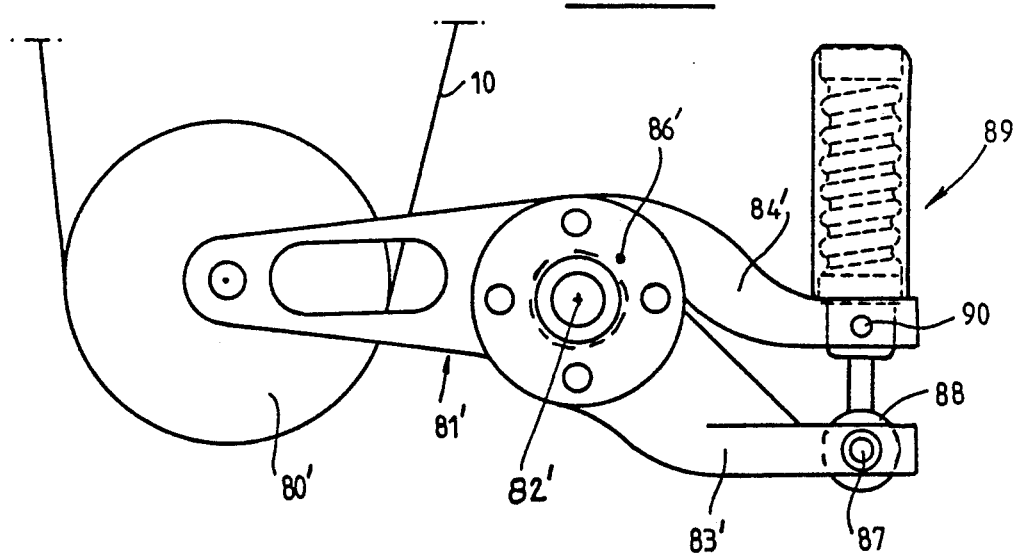

TENSIONER FOR A POWER TRANSMISSION BELT

BACKGROUND OF THE INVENTION

The invention relates to a tensioner for a power transmission belt.

Tensioners for belt power transmission systems have already been proposed, in particular by the Applicant in FR-A-2 597 565 or FR-A-2 612 591. In the embodiments according to these documents, a linear tensioner for a power transmission belt comprises a return spring associated with the shaft of a tensioner roller with which the belt cooperates for controlling the displacement of said roller and the action of said spring, which is coated with elastomer forming a sheath defining at least a variable volume chamber filled with a liquid, said chamber being closed at one of its ends by a valve device, through which the passage of the liquid entering or leaving said chamber introduces an effect of damping the vibrations likely to occur in the belt. Although devices of this type are satisfactory for obtaining the desired results, it has proved that their construction, in particular in so far as the manufacture of the elastomer sheaths and fixing them at their ends are concerned, lead to manufacturing costs which are too high for devices for used in the automobile industry where the price factor is of great importance.

In other documents, for example in FR-A-2 617 556, also in the name of the Applicant, a tensioner of rotary type is described having a helical spring exerting a resilient return torque and comprising a flexible member of a general toroidal shape divided into two fluid chambers separated at one of their ends by a valve with dissymmetric operation so as to introduce the desired damping effect. The manufacture of such a device is also relatively expensive and leads to a relatively cumbersome assembly.

Since, however, the natural extension of the belt during use, as well as the vibrations generated in the belt by cyclic irregularities of the engine speed, are accompanied by slipping of the belt over the pulleys of the driven members—with consequently transmission defects—it is important to remedy this drawback of belt power transmissions using a tensioner, either rotary or linear depending on the organization of the belt power transmission, but which in all cases must be of as low a size and cost as possible, while offering great safety and reliability.

SUMMARY OF THE INVENTION

Consequently, an object of the invention is to provide a tensioner for a power transmission belt which, while offering the same results as known devices, is nevertheless much simpler in structure and therefore of a lower manufacturing cost.

Another object of the invention is to provide such a tensioner of smaller size, particularly shorter than known devices, and which thus has the advantage of requiring less space for use thereof, which makes application thereof possible in cases where the available volume is limited, for example in some systems associated with motor vehicle engines.

A tensioner for a power transmission belt according to the invention comprises a tensioning roller with which the belt cooperates, a return spring for controlling the displacement of the roller during a decrease of tension of the belt and means for damping the vibrations likely to occur in the belt and comprising two variable volume chambers filled with a liquid and communicating together at one of their ends through a valve device through which the passage of the liquid entering and/or leaving said chambers introduces the damping effect, is characterized in that the sidewall at least of one of the chambers is a membrane made from an elastomer material, such as rubber, having a general bell-shape and without spring, and in that the return spring associated with the other chamber is formed by a coil spring working under compression, prestressed in its rest state.

In the preferred embodiment, the return spring is fast by coating with an elastomer material sheath forming the sidewall of the chamber with which it is associated.

The ends of the sheath fast with the spring and the ends of the membrane having a general bell-shape are advantageously fixed to their respective mounting members by adherence during molding.

In a variant, the ends of the sheath fast with the spring, as well as the ends of the membrane having a general bell-shape are fixed to their respective mounting members by crimping means.

Thus, the cost of manufacturing the devices in accordance with the invention is considerably reduced with respect to known tensioner constructions, which comprise machined parts for mounting them which are expensive to manufacture.

In another embodiment, the sidewall of the chamber with which the spring is associated is an indeformable rigid tube inside which said spring is housed.

BRIEF DESCRIPTION OF THE DRAWINGS

Other features and advantages of the invention will be clear from the following description, given by way of example with reference to the accompanying drawings in which:

FIG. 3 is a view similar to that of FIG. 2 but for a variant;

FIG. 4 is a view similar to that of FIGS. 2 and 3 but for another embodiment;

FIG. 5 is a schematic view of another embodiment of a tensioner according to the invention;

FIG. 6 is a view similar to that of FIG. 5 but for a variant.

DESCRIPTION OF THE PREFERRED EMBODIMENTS

Figures 1, 2:
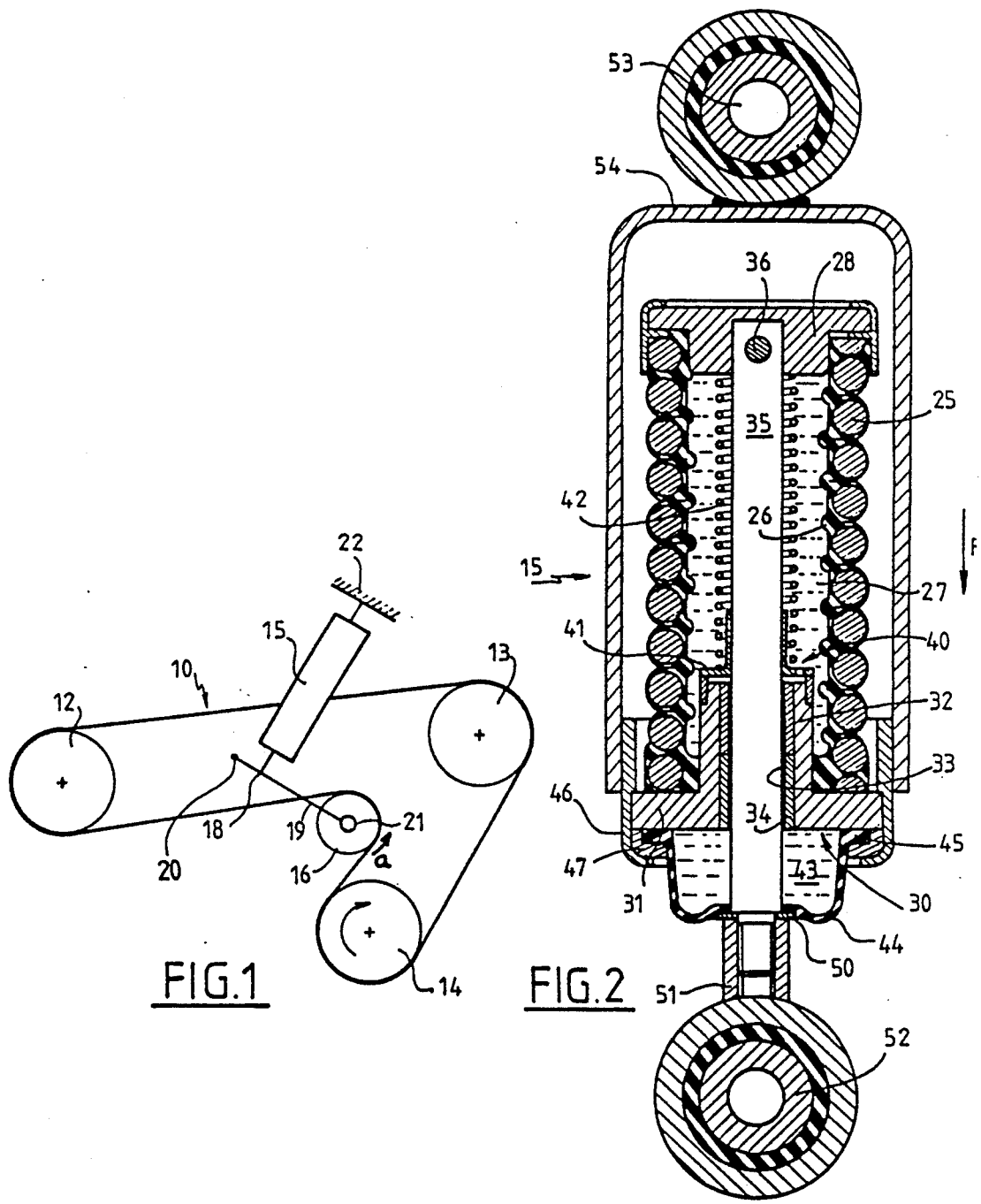
FIG. 1 is a very schematic view of a belt power transmission system.
FIG. 2 is a schematic diagram of a tensioner according to the invention in longitudinal section for a first embodiment.

Referring first of all to FIG. 1 which illustrates very schematically a power transmission system in which a belt 10 cooperates with the flanges of pulleys 12 and 13 fast for rotation with driven shafts and with the flanges of a pulley 14 fast with a driving shaft for example the crankshaft of a motor, truck, agricultural machine or similar engine. To provide tensioning of belt 10, a tensioner 15 is associated with the system and is fastened at point 18 on a lever 19, which is mounted for pivoting at one of its ends about a shaft 20 and having at its other end a roller 16 rotating about a shaft 21. Tensioner 15, whose end opposite that of the fastening point to the lever is fixed to the engine block, referenced schematically at 22, is intended to take up the extension of belt 10 and prevent it from slipping on the flanges of the pulleys and also to damp the vibrations generated in the belt 10 by the cyclic irregularities of the engine speed, particularly when idling, or during shocks generated during start-up and/or stopping of the apparatus driven by the shafts fixed to pulleys 12 and 13.

In accordance with the invention, tensioner 15 (FIG. 2) comprises a coil spring 25 fast by coating with a sheath 26 made from an elastomer material, such as nitrile rubber, and which forms the sidewall of a first liquid filled chamber 27. Said chamber, of a general cylindrical shape, is closed at one of its ends by a first closure means 28, sealingly fixed by bonding to the assembly formed by sheath 26 and spring 25 during molding of this assembly, whereas the other end of chamber 27 is closed by a second closure means 30, of revolution, with a T shaped cross section and which thus has a base 31 with circular contour on which a barrel 32 is erected. Both base 31 and barrel 32 are pierced with a bore 33 for guiding, preferably with interpositioning of rings such as 34, a rod 35 fast at one of its ends, by a pin 36, with closure means 28.

In chamber 27 a valve device 40 is also housed, in the vicinity of closure means 30, illustrated here schematically in the form of a valve head 41 on which the action of a return spring 42 surrounding rod 35 is exerted, said device being organized so as to permit the flow, advantageously dissymmetrically, of the liquid contained in chamber 27 between said chamber and a second chamber 43. The latter is defined laterally by a wall formed by a membrane 44 made from an elastomer material, such as rubber, having a general bell-shape, which also serves as bottom wall and whose free edge 45 is bonded to base 31 and to a clamping disk 47 covered by a cap 46. The bottom zone of membrane 44, namely that which is the furthest away from base 31, is pierced with an orifice for passing therethrough the second end of rod 35 which is fixed, by a sealed mounting, shown schematically at 50, to a short spout 51 fast with a ring 52 for attachment to lever 19.

A similar ring 53 is provided at the other end of the tensioner, ring 53 being fast with a bell 54 whose length is substantially that of spring 25 which it encloses thus totally or partially while being fixed, at its portion opposite ring 53, to cap 46.

The operation of the tensioner—thus without spring operating under traction as in known tensioners and in which the spring 25 is a spring acting under compression, prestressed in its rest state—is clear from the foregoing: as soon as the tension of belt 10 decreases, spring 25 expands, causing displacement of closure means 28 and simultaneously of rod 35 in the direction of arrow F with the corresponding passage of liquid from chamber 43 to chamber 27 when the valve head 41 is lifted. Thus, weak damping is obtained which permits lever 19 and roller 21 to pivot rapidly in the direction of arrow a so as to adjust the tension in the belt in a very short time.

If, on the other hand, the tension of the latter increases, lever 19 pivots in the opposite direction to arrow a and rod 35 is displaced in the direction of arrow F; the liquid enclosed in chamber 27 reaches chamber 43, and while passing through valve 40 causes a maximum damping effect.

The structure of the tensioner illustrated in FIG. 3 is very close to that of the tensioner shown in FIG. 2 and only differs therefrom by the fact that the closure means 28' and 30' defining the chamber 27' are here fixed to spring 25' and the elastomer sheath 26' which is fast therewith, not by bonding but by crimping, as shown schematically at 60 and 61, the ends of the elastomer sheath 26' being in the form of sleeves 62 and 63, respectively, of a greater length and greater thickness than the corresponding end portions of sheath 26 of the preceding embodiments so as to permit satisfactory crimping.

The operation of this embodiment is identical to that illustrated in FIG. 2, in particular in so far as the valve device separating chamber 27' from chamber 43' is concerned, and which is not shown integrally in FIG. 3.

In the embodiment illustrated in FIG. 4, the coil spring 65—similar to springs 25 and 25' of the preceding embodiments—is not coated with an elastomer material but is housed in a rigid and indeformable tube 66 forming the sidewall of a liquid filled chamber 67 and which is similar to chambers 27 and 27' of the preceding embodiments. Chamber 67 is closed at one of its ends by a closure means 68 mounted for sliding in tube 66 with interpositioning between said tube and the closure means of a seal 69 and the other end of the chamber is closed by a closure means 70, similar to closure means 30 and 30' of the preceding embodiments, and with which is associated a valve 71 similar to valve 40 of the embodiment shown in FIG. 2. As in the tensioner illustrated in this FIGURE, valve 71 permits the liquid contained in chamber 67 to pass to chamber 72 and vice versa, said chamber 72 being defined by the closure means 70 and an elastomer membrane 73 having a general bell-shape and which is quite similar to membrane 44 of the preceding embodiments.

The operation of this tensioner, in which the coil spring 65 prestressed in its rest state is provided for working under compression only, is quite similar to that of the embodiments described with reference to FIGS. 2 and 3.

Reference will now be made to FIGS. 5 and 6 which show two embodiments of a very compact tensioner particularly well suited for regulating the tension of the belt with which it cooperates without special mounting and measuring tools.

In the embodiment of FIG. 5, roller 80 intended to cooperate with belt 10 is mounted for rotation at the end of a cranked apertured arm 81 rotatable about a shaft 82, the portion 83 of arm 81 distant from that carrying roller 81 facing an arm 84. Between the latter and portion 83 is mounted a device 85 similar to the compression spring devices, fluid chambers and valve which have just been described with reference to FIGS. 2 to 4. After device 85, whose spring has been prestressed, has been positioned between the ends of arms 81 and 84, said arms are immobilized against rotation with respect to each other by a pin 86 and the tensioner is fixed to the engine block which it is to equip, so as to place roller 80 in contact with the belt 10, by rotating the whole of the tensioner about shaft 82; with this contact made between the roller and the belt, the tensioner is fixed in position on the engine block by a means, not shown, which immobilizes arm 84 with respect to said engine block. Pin 86 is then removed and with device 85 operative, the cranked arm 81 pivots about shaft 82 in the direction of arrow f so as to give belt 10 the desired tension, defined by the prestress rate imposed on the spring of device 85. The tensioner may thus be put into position in an assembly chain without special tooling and the initial tension of the belt may be provided without a special measuring tool.

When, in time, the tension of the belt decreases, the expansion of the spring included in device 85 causes a pivoting movement of lever 81 in the direction of arrow f, which takes up the tension of the belt with the desired damping effect introduced by the valve device separating the two fluid chambers which said device 85 comprises.

In the embodiment of FIG. 6, similar to that which has just been described immediately above, roller 80' which cooperates with belt 10 is mounted for rotation at the end of a cranked arm 81' similar to arm 81 of the preceding embodiment but whose portion 83' is articulated by a pin 87 to a ring 88 of a device 89 similar to the compression spring device, fluid chambers and valve described in connection with FIGS. 2 to 4. Arm 84', which is the one fixed to the engine block after the device has been positioned, is connected by a shaft 90 to the casing of device 89, the latter then being mounted under "traction" for applications requiring reversal of the tensioning direction of the roller with respect to the embodiment of FIG. 5. As in the latter embodiment, however, the tensioner is first of all positioned on the engine block with a pin 86'—similar to pin 86—which immobilizes arms 81' and 84' with respect to each other then, after rotation about shaft 82' bringing roller 80' in contact with belt 10, said pin is withdrawn.

In one and other embodiment described immediately above, the weakest damping corresponds to the direction of movement of the tensioning roller 80 or 80' which is that for which belt 10 is expanded in the loop of said roller, whereas the highest damping is that corresponding to an increase of the tension of the belt.

What is claimed is:

1. A tensioner for a power transmission belt having a tensioning roller with which the belt cooperates,
    a return spring, formed by a coil spring working under compression and prestressed in its rest state, for controlling the displacement of said roller when the tension of the belt decreases,
    means for damping the vibrations likely to occur in the belt and comprising two variable volume chambers filled with a liquid and communicating together at one of their ends through a bi-directional flow valve device through which the passage of the liquid entering and leaving said chambers introduces a damping effect, and
    wherein the sidewall of at least one of the chambers is a membrane made from an elastomer material, having a general bell-shape and without a spring.

2. The tensioner as claimed in claim 1, wherein said return spring is fast by coating with an elastomer material sheath forming the sidewall of the chamber with which said return spring is associated and the ends of the sheath fast with the return spring and the ends of the membrane having a general bell-shape are fixed to their respective mounting members by crimping.

3. The tensioner as claimed in claim 1, wherein the return spring is fast by coating with an elastomer material sheath forming the sidewall of the chamber with which it is associated and the ends of the sheath fast with the spring and the ends of the membrane having a general bell-shape are fixed to their respective mounting members by bonding during molding.

4. The tensioner as claimed in claim 1, wherein the sidewall of the chamber with which the return spring is associated is a rigid indeformable tube inside which said spring is housed.

5. The tensioner as claimed in claim 1, wherein the tensioning roller is carried at the end of a rotary arm whose other end is subjected to the action of said return spring.

6. The tensioner as claimed in claim 1, where said bi-directional valve has a dissymmetrical flow.

* * * * *